US010964216B2

(12) United States Patent
Buburuzan et al.

(10) Patent No.: US 10,964,216 B2
(45) Date of Patent: Mar. 30, 2021

(54) METHOD FOR PROVIDING INFORMATION ABOUT A VEHICLE'S ANTICIPATED DRIVING INTENTION

(71) Applicant: VOLKSWAGEN AG, Wolfsburg (DE)

(72) Inventors: Teodor Buburuzan, Braunschweig (DE); Bernd Rech, Bokensdorf (DE); Bernd Lehmann, Wolfsburg (DE); Monique Engel, Braunschweig (DE); Sandra Kleinau, Rötgesbüttel (DE); Stefan Gläser, Braunschweig (DE); Hendrik-Jörn Günther, Hannover (DE); Johannes Hartog, Braunschweig (DE)

(73) Assignee: Volkswagen AG ( * ) Notice: Subject to any disclaimer, the term of this patent is extended or adjusted under 35 U.S.C. 154(b) by 227 days.

(21) Appl. No.: 15/704,033

(22) Filed: Sep. 14, 2017

(65) Prior Publication Data
US 2018/0075745 A1 Mar. 15, 2018

(30) Foreign Application Priority Data

Sep. 15, 2016 (DE) ...................... 10 2016 217 645.5

(51) Int. Cl.
G08G 1/16 (2006.01)
B60W 30/09 (2012.01)
B60W 30/16 (2020.01)

(52) U.S. Cl.
CPC ............ G08G 1/161 (2013.01); B60W 30/09 (2013.01); B60W 30/16 (2013.01); G08G 1/162 (2013.01);
(Continued)

(58) Field of Classification Search
None
See application file for complete search history.

(56) References Cited

U.S. PATENT DOCUMENTS 6,853,906 B1 2/2005 Michi et al.
8,810,431 B2 8/2014 Mudalige et al.
(Continued)

FOREIGN PATENT DOCUMENTS

DE 10244205 A1 3/2004
DE 102004035571 A1 2/2006
(Continued)

OTHER PUBLICATIONS

Office Action for Korean Patent Application No. 10-2017-0117874; dated Nov. 28, 2018.
(Continued)

Primary Examiner — Dale W Hilgendorf
Assistant Examiner — Alexander C. Bost
(74) Attorney, Agent, or Firm — Barnes & Thornburg, LLP

(57) ABSTRACT

A method for providing information about a probable driving intention of a first vehicle. The method includes ascertaining, using a locating device, first position data, which indicate the approximate position of the first vehicle, and map data for the first position data, and capturing, using cameras and/or sensors in the first vehicle, information about the surroundings in proximity to the first vehicle. The method also includes determining information about a probable trajectory of the first vehicle, and providing information about a probable driving intention of the first vehicle, based on the information about the probable trajectory of the first vehicle, the position data, the information about the surroundings and the map data. The method also includes transmitting the information about the probable driving intention of the first vehicle to a second vehicle and/or one or more vehicle-external entities.

25 Claims, 7 Drawing Sheets

(52) U.S. Cl.
    CPC ..... *G08G 1/166* (2013.01); *B60W 2554/4041* (2020.02); *G05D 2201/0213* (2013.01)

(56) References Cited

U.S. PATENT DOCUMENTS

| | | | | |
|---|---|---|---|---|
| 10,460,534 | B1* | 10/2019 | Brandmaier | G07C 5/008 |
| 2012/0286974 | A1* | 11/2012 | Claussen | G08G 1/162 |
| | | | | 340/935 |
| 2014/0012492 | A1* | 1/2014 | Bowers | G08G 1/16 |
| | | | | 701/301 |
| 2014/0195072 | A1* | 7/2014 | Graumann | G01S 5/0072 |
| | | | | 701/2 |
| 2016/0054736 | A1 | 2/2016 | Kolhouse et al. | |
| 2016/0167579 | A1 | 6/2016 | Hwang et al. | |
| 2017/0120906 | A1* | 5/2017 | Penilla | B60W 30/08 |
| 2017/0169709 | A1* | 6/2017 | Ando | G08G 1/161 |
| 2017/0221366 | A1* | 8/2017 | An | G08G 1/07 |
| 2017/0225686 | A1* | 8/2017 | Takaso | G08G 1/167 |
| 2017/0268896 | A1* | 9/2017 | Bai | G01C 21/36 |
| 2018/0345963 | A1* | 12/2018 | Maura | G05D 1/0088 |
| 2018/0356835 | A1* | 12/2018 | Gehring | G08G 1/22 |
| 2019/0012908 | A1* | 1/2019 | Chun | G01S 19/42 |
| 2019/0016345 | A1* | 1/2019 | Kitagawa | G08G 1/09623 |
| 2019/0078897 | A1* | 3/2019 | Sumizawa | B60W 30/18145 |

FOREIGN PATENT DOCUMENTS

| | | |
|---|---|---|
| DE | 102010040803 A1 | 3/2012 |
| DE | 102011113019 A1 | 5/2012 |
| DE | 102012218935 A1 | 4/2013 |
| DE | 102013211244 A1 | 12/2014 |
| DE | 102014205953 A1 | 10/2015 |
| DE | 102014213171 A1 | 10/2015 |
| DE | 102015214689 A1 | 2/2016 |
| DE | 102015010559 A1 | 3/2016 |
| DE | 102014223000 A1 | 5/2016 |
| DE | 102015200059 A1 | 7/2016 |
| KR | 20010099826 A | 11/2001 |
| KR | 20140000488 A | 1/2014 |
| KR | 20150045789 A | 4/2015 |
| KR | 20160071161 A | 6/2016 |

OTHER PUBLICATIONS

Office Action for Korean Patent Application No. 10-2017-0117874; dated Jul. 24, 2020.

* cited by examiner

METHOD FOR PROVIDING INFORMATION ABOUT A VEHICLE'S ANTICIPATED DRIVING INTENTION

PRIORITY CLAIM

This patent application claims priority to German Patent Application No. 10 2016 217 645.5, filed 15 Sep. 2016, the disclosure of which is incorporated herein by reference in its entirety.

SUMMARY

Illustrative embodiments relate to a method, an apparatus and a computer program for providing and handling information about a probable driving intention.

BRIEF DESCRIPTION OF THE DRAWINGS

The disclosed embodiments are described below with reference to the associated drawings, in which.

DETAILED DESCRIPTION

Figure 1:
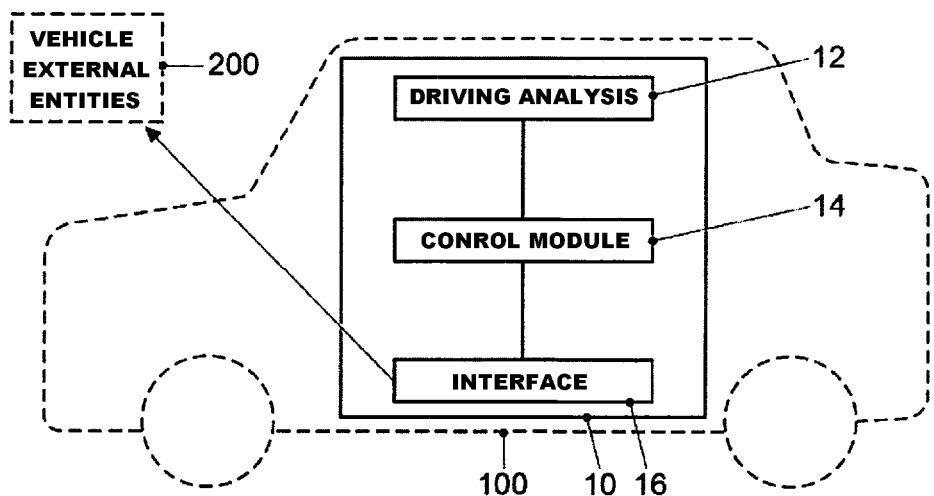
FIG. 1 shows a block diagram of an exemplary embodiment of an apparatus for providing a piece of information about a probable driving intention.

Future driver assistance systems, such as Connected ACC, queue start from a standstill at a light signal installation (traffic lights), filter assistant and junction assistant, for example, could be realized more easily and better if the intention of other vehicles regarding their planned route in the near future were known.

An important prerequisite for the practical realization of such systems is that the trajectories sent have "semantic accuracy". The challenge in this case is to interchange the trajectories between vehicles, so that they can be interpreted by other vehicles almost without error. The data of the respective vehicles have a high probability of being subject to measurement inaccuracies. These measurement inaccuracies are insignificant for a single vehicle, since all the software components in the vehicle operate with the same errors in the data. Errors are compensated for during regulation of the driving maneuver. When two vehicles communicate with one another, these errors can lead to misinterpretations. The effect of the measurement errors of the vehicles during communication may be additive or even multiplicative.

The disclosed embodiments implement a description of trajectories that is robust in the face of such measurement inaccuracies, so that error-free interpretation is possible.

DE 10 2013 211 244 A1 describes a system for cooperative driving of road vehicles and local public transport vehicles. The local public transport vehicles comprise a GPS receiver that is set up to ascertain a current position of the local public transport vehicle, and a camera that is set up to ascertain a piece of information concerning the number of passengers in the local public transport vehicle. An imminent turn by the local public transport vehicle is ascertained and is indicated to the driver of a road vehicle.

US 2016/0054736 A1 describes methods and systems for grouping vehicles for cooperative driving, that is to say for cooperative sharing of an aerodynamic cargo. To identify a first vehicle as a carrier vehicle, at least proximity data, current direction data, size data, type data, power data, weight data, destination data or preferential guidelines are analyzed. A second vehicle is controlled (positioned), the second vehicle being arranged in the slipstream of the carrier vehicle.

DE 10 2015 214 689 A1 describes a system for a vehicle, comprising (a) a position determination unit for determining the position of the vehicle, (b) a reception unit for receiving environment data from at least one second vehicle, which include information and/or variables at least about a first lane, (c) a signal processing unit for computing a trajectory of the ego vehicle by information about the ego vehicle, with the signal processing unit further using the environment data received from the second vehicle at least about the first lane and using information about the ego vehicle itself to compute whether the trajectory of the ego vehicle intersects a trajectory of an object or of the second vehicle in the first lane, and hence whether the vehicle will collide with this object and/or the second vehicle, wherein the system is configured such that in the event of the vehicle being intended to change to the first lane and/or being intended to cross the first lane, a probability of collision between the ego vehicle and the object and/or the second vehicle is ascertained, particularly for an interval of time in the future, and a check is performed to determine whether the probability of collision exceeds a first defined threshold value.

The document DE 10 2011 113 019 A1 relates to a method for ascertaining and rating risks of a situation between at least two road users in a road junction region.

The document DE 10 2010 040 803 A1 proposes a visual driver information and warning system for a driver of a motor vehicle.

The document DE 10 2004 035 571 A1 proposes a method for vehicle position determination by locating on a traffic route network.

A method for predicting a driver intention is proposed in the document DE 10 2015 200 059 A1.

The document DE 10 2014 205 953 A1 relates to a method for analyzing a traffic environment situation of a vehicle.

The document DE 102 44 205 A1 proposes a method for preventing vehicles from colliding.

A further problem for known systems is the description of the trajectory. If a vehicle travels on a straight freeway, for example, at a speed of 100 km/h and it is possible to safely predict for the next seven seconds that the vehicle will continue to travel straight on in the lane, then this means that the vehicle will have covered approximately 195 meters in seven seconds. This is the description of the trajectory. A problem in this case is that this trajectory can be described only relative to the vehicle. If such a trajectory is sent, a receiving vehicle cannot use the information about the trajectory while the trajectory from the sending vehicle is not transformed into the coordinate system of the receiving vehicle. This is effected mathematically always in the same way, by rotating and shifting. Shifting is effected relatively easily and can be accomplished in two different ways: if the vehicles are in sensor range, the shift vector can be determined by this method, or it can be determined using the GPS position (WGS84). What is problematical is the rotation, that is to say the reciprocal orientation of the vehicles. This cannot readily be determined using sensors and is always effected using the global orientation (WGS84). If the triangular computation is produced therefor, the result is the following: if side A and side B of an isosceles triangle are 195 meters long and there is an angle of 0.5° (the error) between them, then side C is approximately 1.7 meters long. In this case, it can no longer be explicitly determined whether the sending vehicle wishes to remain in its own lane or wants to perform a change of lane in 195 meters. Hence, the sending of the trajectory is irrelevant. The computation indicated by way of example is even an idealized computation in the present case, since it is assumed that a vehicle has made an error in determining the heading. If it can be assumed that an error has occurred in both vehicles, then the computed result becomes even less favorable. A further feature is that an angle of 0.5° can currently be achieved only with very great complexity and, for this reason, the functions cannot be constructed on the basis of these locating solutions.

In the ego vehicle, such an error is not relevant, since all the components use the same errors for computation and these errors are corrected sooner or later by the information from the sensors. A problem therefore first arises in connection with the communication between two vehicles.

The disclosed embodiments describe a trajectory for the appearance of the topology from the point of view of the sending vehicle, so that the receiving vehicle can use features of the surroundings to perform matching for the received topology and hence can determine and compute the relative error.

This is achieved by methods apparatuses, a vehicle, and a computer program product.

The disclosed method for providing information about a probable driving intention of a first vehicle comprises: ascertaining, using a locating device, first position data, which indicate the approximate position of the first vehicle, and map data for the first position data; capturing, using cameras and/or sensors in the first vehicle, information about the surroundings in proximity to the first vehicle; determining information about a probable trajectory of the first vehicle (100); providing information about a probable driving intention of the first vehicle (100), based on the information about the probable trajectory of the first vehicle, the position data, the information about the surroundings and the map data; and transmitting the information about the probable driving intention of the first vehicle to a second vehicle and/or one or more vehicle-external entities.

The disclosed method uses a global coordinate system only to perform very coarse localization. Accurate localization is then effected on a feature basis. This means that the trajectory depictions are described relative to properties of the surroundings, in this case relative to topological changes in the road, start of a junction or end of a junction.

In the disclosed method, has use of the properties (features) of the surroundings allows the aforementioned measurement inaccuracies of the vehicles to be compensated for.

According to a further disclosed embodiment, there is provision for the information about the probable driving intention to comprise (i) at least one first image captured by the cameras and/or sensors, and/or (ii) at least one first surroundings feature extracted from the at least one first image, and/or (iii) the map data.

According to disclosed embodiments, there is provision for the at least one first feature (i) to be or to correspond to the total number of lanes at a current position of the first vehicle, and/or (ii) to be or to correspond to an approach toward or positioning at (a) a light signal installation, (b) a T junction, (c) a lane convergence, (d) a lane divergence, or (e) a junction.

An embodiment of the disclosed method provides for the information about the probable trajectory to comprise information about a plurality of time/position points, wherein a time/position point comprises a time component and a position component, and/or for the determining of information about a probable trajectory of the first vehicle (100) to be based on at least one element from the group comprising information about a steering angle, information about a position of the vehicle (100), information about a speed of the vehicle (100), information about an acceleration of the vehicle (100), information about a direction of travel indicator, information about a spacing of other vehicles, information about direction of travel indicators of other vehicles, information about a light signal installation, information about an automatic driving control system and map information.

According to disclosed embodiments, there is provision for the determining of the time components and/or of the position components of the plurality of time/position points to be based on a variable temporal or local spacing, and/or for the determining of the time components and/or of the position components of the plurality of time/position points to be based on driving dynamics of the first vehicle, and/or for the time components of the plurality of time/position points to correspond to absolute times, times relative to a global reference time system and/or times relative to a local reference time system, and/or for the position components of the plurality of time/position points to comprise at least one element from the group comprising absolute position points, position points relative to a traffic infrastructure and selection of a geometric component of the traffic infrastructure.

According to a further disclosed embodiment, there is provision for the information about the probable driving intention to comprise the information about the probable trajectory as a semantic description.

According to the disclosed embodiments, a method for a second vehicle is additionally provided, which comprises the following: obtaining information about a probable driving intention of at least one first vehicle, wherein the information about a probable driving intention of at least one first vehicle has been generated using a method according to one of the preceding claims, and determining a driving recommendation, based on the information about the probable driving intention of the at least one first vehicle.

According to a further disclosed embodiment, there is provision for the determining of a driving recommendation to comprise: ascertaining, using a locating device, position data that indicate the approximate position of the second vehicle; capturing, using cameras and/or sensors in the second vehicle, information about the surroundings in proximity to the second vehicle.

According to a further disclosed embodiment, there is provision for the determining of a driving recommendation to comprise: extracting, from the information about a probable driving intention of at least one first vehicle, information about the surroundings in proximity to the first vehicle, and comparing the information about the surroundings in proximity to the second vehicle with the information about the surroundings in proximity to the first vehicle, to determine whether there is a match, and, in the event of a match, determining a driving recommendation.

According to a further disclosed embodiment, there is provision for the determining of a driving recommendation to comprise: extracting, from the information about a probable driving intention of at least one first vehicle, the at least one first surroundings feature of the first vehicle, extracting, from the at least one image captured by the cameras and/or sensors in the second vehicle, at least one second surroundings feature of the second vehicle, and executing a matching algorithm to determine whether there is a match between the at least one first feature and the at least one second feature, and, in the event of a match, determining a driving recommendation. According to a further disclosed embodiment, there is provision for the at least one first feature (i) to be or to correspond to the total number of lanes at a current position of the first vehicle, and/or (ii) to be or to correspond to an approach toward or positioning at (a) a light signal installation, (b) a T junction, (c) a lane convergence, (d) a lane divergence, or (e) a junction.

According to the disclosed embodiment, an apparatus for use in a first vehicle is additionally provided that comprises the following: a driving analysis module (12), a control module (14) and an interface (16), wherein the control module (14) is configured to perform the method according to one of claims 1 to 6.

According to the disclosed embodiment, an apparatus for use in a second vehicle is additionally provided that comprises the following: a driving analysis module (12), a control module (14) and an interface (16), wherein the control module (14) is configured to perform the method according to one of claims 7 to 11.

According to the disclosed embodiment, a vehicle is additionally provided, characterized in that it comprises an apparatus according to claim 12 or an apparatus according to claim 13.

According to the disclosed embodiment, a computer program product having program code for performing the method according to one of claims 1 to 6, or 7 to 11 when the program product is executed on an apparatus or an information system (10) is additionally provided.

The disclosed vehicle comprises an apparatus as described above and at least two sensors for determination of location and/or orientation. The same benefits and modifications as described above are applicable.

The disclosed computer program product comprises a program code for performing the method described above when the program product is executed on a computation unit or an apparatus for determining the position and/or orientation of a vehicle. The same benefits and modifications as described above are applicable.

Further configurations emerge from the remaining features cited in the subclaims.

The various disclosed embodiments cited in this application can be combined with one another, unless stated otherwise in individual cases.

FIG. 1 illustrates a block diagram of an exemplary embodiment of an apparatus 10 for a vehicle 100. The apparatus comprises a driving analysis module 12, configured to determine information about a probable trajectory of the vehicle 100. The apparatus 10 further comprises a control module 14, configured to determine information about a probable driving intention of the vehicle 100, based on the information about the probable trajectory of the vehicle 100. The apparatus 10 further comprises an interface 16, configured to provide the information about the probable driving intention for one or more vehicle-external entities 200. The control module 14 is coupled to the driving analysis module 12 and the interface 16.

In some exemplary embodiments, the driving analysis module 12 could determine the information about the probable trajectory based on a system for automatic distance regulation or based on an autopilot, for example. The vehicle 100 could comprise the automatic distance regulation or the autopilot, for example. In some exemplary embodiments, the automatic distance regulation and/or the autopilot could also be comprised by the apparatus 10. The driving analysis module 12 could use a planned trajectory that has been computed by the system for the automatic distance regulation or the autopilot, for example, to determine the information about the probable trajectory.

Alternatively or additionally, the driving analysis module 12 could be configured to determine the information about the probable trajectory based on at least one element from the group comprising information about a steering angle, information about a position of the vehicle 100, information about a speed of the vehicle 100, information about an acceleration of the vehicle 100, information about a direction of travel indicator, information about a spacing of other vehicles, information about direction of travel indicators of other vehicles, information about a light signal installation, information about an automatic driving control system and map information. The driving analysis module 12 could, by way of example, be configured to obtain information about an information interface of the vehicle, for example, about a controller area network bus (CAN bus), for example, to obtain the information about the steering angle or the information about the direction of travel indicator. The driving analysis module 12 could, by way of example, determine the information about the probable trajectory based on speed, acceleration and/or deceleration data that it has obtained via the CAN bus, for example. The driving analysis module 12 could further, by way of example, obtain data from a sensor module, for example, video data from a camera for the information about the spacing of other vehicles, the information about the direction of travel indicator of the other vehicles and/or the information about the light signal installation, or, by way of example, distance data from a distance measurement sensor for the information about the spacing of the other vehicles, for example, based on a delay time method. The driving analysis module 12 may, in some exemplary embodiments, further be configured to analyze raw data, for example, video data, to extract the information, for example, using pattern recognition, from the raw data, for example, flashing signals from other vehicles or traffic-light light from image data. In some exemplary embodiments, the driving analysis module 12 could further be configured to obtain the information from vehicle-external sources, for example, changeover times from a light signal installation. The automatic driving control system could correspond to an adaptive distance regulator, an adaptive cruise control or an autopilot, for example.

The driving analysis module 12 may further be configured to take the obtained or analyzed information as a basis for performing a probability analysis and/or a pattern comparison with a collection of traffic patterns to determine the probable trajectory. By way of example, the driving analysis module 12 could take a wheel angle, a speed and/or an acceleration of the vehicle as a basis for extrapolating the probable trajectory, for example, taking into consideration the other road users on the basis of the spacing data or video data. In some exemplary embodiments, the driving analysis module 12 could be configured to determine the probable trajectory on the basis of location data or navigation data, for example, based on a probable turning lane based on a navigation destination or based on a probable route based on a chosen turning lane at a junction.

In at least some exemplary embodiments, the information about the probable trajectory comprises information concerning what route the vehicle will probably take in the immediate future. The information about the probable trajectory could comprise information about a plurality of time/position points, for example, with a time/position point comprising a time component and a position component. In at least some exemplary embodiments, the information about the probable trajectory could comprise a period from 0 to 10 seconds, for example, a period of the next 1, 2, 3, 4, 5, 6, 7, 8, 9, 10, 12, 15, 16 or 20 seconds, or those following a reference time, or the driving analysis module 12 could provide time/position points for a period of time for which a confidence interval for the prediction is above a threshold value.

In different driving situations, the information about the probable trajectory could in this case comprise a different granularity of information. The driving analysis module 12 could, by way of example, be configured to determine the time components and/or the position components of the plurality of time/position points based on a variable temporal or local spacing, for example, based on driving dynamics of the vehicle, based on the information about the spacing of the other vehicles or based on the information about the light signal installation.

The time/position points may, in some exemplary embodiments, be defined in absolute or relative terms in this case. Time components of the plurality of time/position points could, by way of example, correspond to absolute times, times relative to a global reference time system and/or times relative to a local reference time system. A global reference time system could, by way of example, depict the time information of a global satellite navigation system or the time of a radio time transmission system, and a local reference time system could, by way of example, depict a synchronized time within a local radio network. The position components of the plurality of time/position points could comprise at least one element from the group comprising absolute position points, position points relative to a traffic infrastructure and selection of a geometric component of the traffic infrastructure. Absolute position points could in this case be based on a satellite navigation system, for example, and position points relative to the traffic infrastructure could indicate a position on a road/at a junction (route meters, spacing from center/lane), for example. The selection of the geometric component of the traffic infrastructure could correspond to a lane of the traffic infrastructure, for example. If a traffic infrastructure is broken down into geometric components (also referred to as: tiles) that divide the traffic infrastructure into portions (lanes, route meters, turning lanes at junctions), for example, then a selection of these components possibly chosen with a variable granularity could allow a reduction in a transmission volume and a simplified analysis.

When starting from standstill, the planned setting-off/starting time could additionally be comprised in the information about the probable trajectory. The time could be derived from the GNSS (Global Navigation Satellite System) time or as a relative statement from the switching times of a light signal installation (LZA), for example.

Optionally, it would additionally be possible for information pertaining to the lane to be comprised, for example, the lane that the vehicle is in, to what LZA the information relates and/or to what vehicle position in relation to the LZA stop line relevant to the vehicle reference is made.

The number of points on the trajectory could be stipulated in a static manner (for example, value stipulated in the standard of the message format) or could be determined by an algorithm (for example, up to a maximum number stipulated in the standard of the message format, wherein a minimum number could also be stipulated). In some exemplary embodiments, the number of distance/time points for describing a trajectory could be at least 10.

The temporal and/or local spacing of the points of the trajectory could likewise be stipulated in a static manner (for example, values stipulated in the standard of the message format) or be determined by an algorithm. In some exemplary embodiments, it will be possible for minimum and maximum spacings between which the trajectory points may lie to be stipulated, e.g., in the standard of the message format. In some exemplary embodiments, the spacings do not have to be equidistant. In some exemplary embodiments, the algorithm for determining spacings could take into consideration the planned driving dynamics (the greater the dynamics, the more densely the points are situated). The trajectories at a standstill and after setting off could also be predicted according to the same algorithm if the starting point is additionally defined as point zero.

Based on the information about the probable trajectory, the control module 14 determines the information about the probable driving intention. The information about the probable driving intention can in this case comprise the information about the probable trajectory, for example, and/or further information going beyond the probable trajectory, for example, a probable lane choice of the vehicle 100, a probable turning intention, or a probable intention to filter into the traffic on a freeway entry ramp. The control module 14 could, by way of example, determine the information about the driving intention further based on the location data, for example, to identify a context for the probable trajectory. By way of example, the information about the driving intention could further be based on the driving dynamics of the driver of the vehicle, for example, whether he tends to perform risky driving maneuvers. The control module 14 could, by way of example, be configured to determine the information about the probable driving intention further based on the driving dynamics of the driver, for example, based on past speed, acceleration and deceleration data. In at least some exemplary embodiments, the control module 14 could be configured to determine the information about the driving intention based on a personality profile of the driver, for example, based on a collection of previous reactions to driving situations. In some exemplary embodiments, the control module 14 is configured to provide the information about the probable driving intention via the interface 16.

The interface 16 could correspond to an interface for the vehicle-to-vehicle communication, for example. The interface 16 could, by way of example, be configured to provide the information about the probable driving intention to further vehicles in surroundings around the vehicle 100. The one or more vehicle-external entities 200 can correspond, by way of example, to further vehicles, entities that collect, aggregate and/or forward information about the probable driving intentions of multiple vehicles, or analysis entities that statistically analyze the information about the probable driving intentions of multiple vehicles. The one or more vehicle-external entities 200 could correspond to or comprise a vehicle 200a, for example.

The information about the probable driving intention could comprise, by way of example, the information about the probable trajectory, for example, according to one of the following definitions. By way of example, the data packets of the information about the probable trajectory could be based on the standard of the European Telecommunications Standards Institute (ETSI) TS 102 894-2 V1.2.1 (definition of path history). Such a message format could comprise, by way of example, header data, a basic data structure and a data structure for the probable trajectory. The header data, for example, an ITS (Intelligent Transport System) PDU (Physical Data Unit) header, could comprise, by way of example, a version of the protocol used (also referred to as: protocolVersion), an identification/numbering of the message (also referred to as: messageId) and an identification of the communicating party (also referred to as: stationId). The basic data structure could comprise, by way of example, a relative time statement relating to the time of generation of the message (also referred to as: generation-DeltaTime), a type of the communicating party (also referred to as: stationType), that is to say whether it is a vehicle, for example, a position and an altitude of the communicating party and optionally, by way of example, also a degree of automation (also referred to as: automationLevel) of the communicating party. The data structure for the probable trajectory can consist of a data structure (for example, a data field having 24 entries [0 . . . 23] that comprises, for each entry, an altered position (pathDeltaPosition), an altered time (pathDeltaTime), an acceleration in longitudinal or transverse direction (longitudinalAcceleration and lateralAcceleration) or optionally also a lane), for example. The data structure for the probable trajectory can correspond to or comprise the information about the probable trajectory, for example. Some elements, for example, the position, the altitude or the acceleration, can also comprise indicators of an accuracy of the information, for example.

In exemplary embodiments, the driving analysis module 12 and/or the control module 14 can correspond to any controller or processor or to a programmable hardware component. By way of example, the driving analysis module 12 and/or the control module 14 may also be realized as software that is programmed for an applicable hardware component. In this respect, the driving analysis module 12 and/or the control module 14 may be implemented as programmable hardware with appropriately adapted software. In this case, any processors, such as digital signal processors (DSPs), can be used. Exemplary embodiments are not limited to one type of processor in this case. Any processors or even multiple processors are conceivable for implementing the driving analysis module 12 and/or the control module 14.

The interface 16 can correspond, by way of example, to one or more inputs and/or one or more outputs for receiving and/or transmitting information, for example, in digital bit values, based on a code, within a module, between modules, or between modules of different entities.

Figure 3:
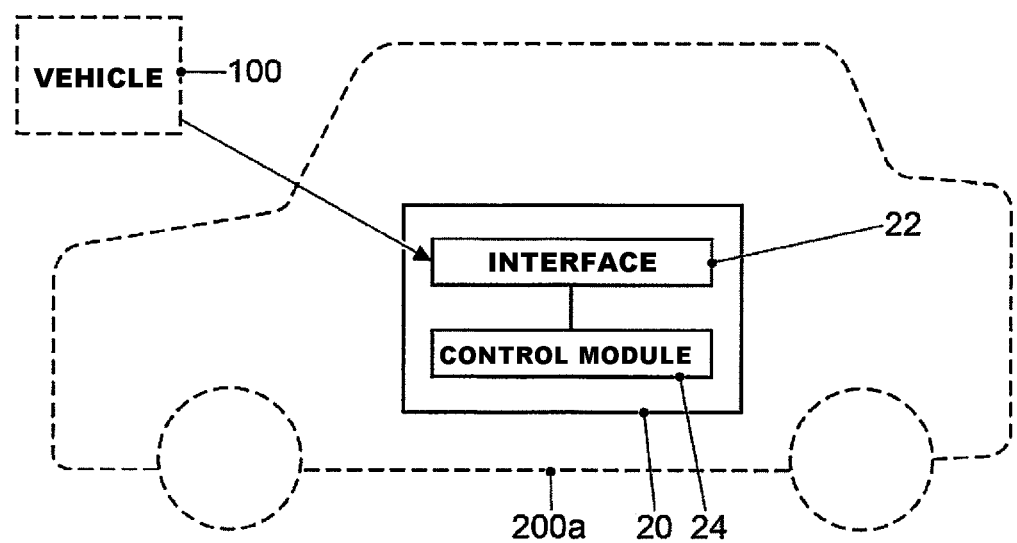
FIG. 3 shows a block diagram of an exemplary embodiment of an apparatus for determining a driving recommendation.

In at least some exemplary embodiments, the vehicle 100, and also a vehicle 200a from FIG. 3, could correspond, by way of example, to a land vehicle, a water craft, an aircraft, a rail vehicle, a road vehicle, an automobile, an all-terrain vehicle, a motor vehicle or a truck.

Figure 2:
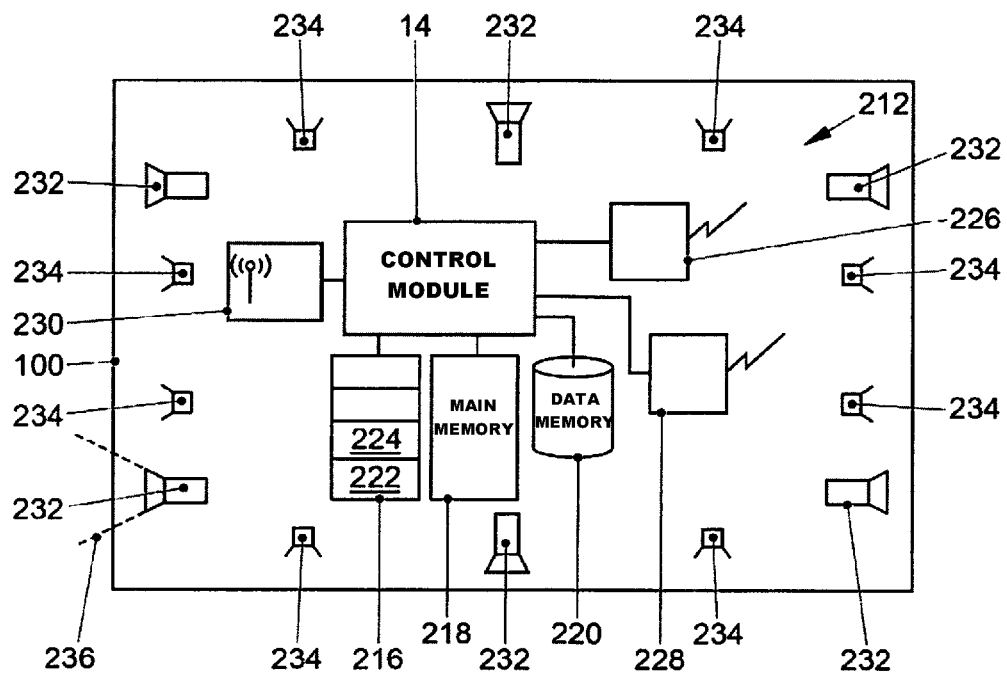
FIG. 2 shows a schematic depiction of a disclosed vehicle with the internal information system.

FIG. 2 shows a vehicle 100 having an internal information system 212. The information system 212 consists of a control module 214 that has a connection to a nonvolatile memory 216, main memory 218 and data memory 220.

Further, the nonvolatile memory 216 has an operating system 222 and at least one driving intention application 224 loaded on it. The operation of the driving intention application 224 is described in more detail below.

The information system 12 also consists of a first receiver 226 for communication with a wireless LAN (WLAN) and of a second receiver 228 for communication with a mobile radio network. An optional GPS unit 230 allows the processor to receive data about the current position of the vehicle. Arranged around the vehicle 100 are multiple cameras 232 and ultrasonic sensors 234. Instead of ultrasonic sensors 234, however, it is also possible to use radar or laser/scanning sensors, for example, for motion detection. The cameras 232 and ultrasonic sensors 234 are configured to capture images from the surroundings of the vehicle continually.

FIG. 3 illustrates a block diagram of an exemplary embodiment of an apparatus 20 for a vehicle 200a. The apparatus 20 comprises an interface 22, configured to obtain information about a probable driving intention of at least one further vehicle 100. The apparatus 20 further comprises a control module 24, configured to determine a driving recommendation, based on the information about the probable driving intention of the at least one further vehicle 100. The interface 22 is coupled to the control module 24.

In at least some exemplary embodiments, the interface 22 could correspond to an interface for vehicle-to-vehicle communication. The interface 22 could be configured, by way of example, to receive the information about the driving intention directly from the at least one further vehicle, for example, via vehicle-to-vehicle communication. Alternatively or additionally, the interface 22 could be configured to receive the information about the driving intention from an entity that collects, aggregates and/or forwards the information about the probable driving intentions of multiple vehicles, for example, in the manner aggregated over multiple vehicles, for example, via vehicle-to-infrastructure communication or via a mobile radio network.

In some exemplary embodiments, the control module 24 could be configured to obtain a further piece of information about a probable driving intention of the vehicle 200a. By way of example, the vehicle 200a could further comprise the apparatus 10. The control module 14 could be configured to provide the further information about the probable driving intention of the vehicle 200a to the apparatus 20. The further information about a probable driving intention of the vehicle 200a could comprise information about a probable trajectory of the vehicle 200a, for example.

The control module 24 could be configured, by way of example, to determine the driving recommendation by comparing the probable trajectory of the vehicle 200a with the probable driving intention of the at least one further vehicle 100 and to determine the driving recommendation such that a collision is avoided or a regular flow of traffic is made possible. The control module could alternatively or additionally compare the probable driving intention of the at least one further vehicle 100 with the current position, direction of travel, speed and/or acceleration of the vehicle 200a, for example, to identify a collision by the vehicle using the probable trajectory of the at least one further vehicle, for example, by virtue of extrapolation of a trajectory of the vehicle 200a and of the at least one further vehicle 100. The control module 24 could further be configured to determine a possible time for an overtaking, filtering or turning maneuver, based on the information about the probable driving intention of the at least one further vehicle, for example, further based on the position, direction of travel, speed and/or acceleration of the vehicle 200a.

The control module 24 could, by way of example, be configured to provide warning information about a possible collision for the driving recommendation based on the information about the probable driving intention of the at least one further vehicle 100 and based on the further information about the probable driving intention of the vehicle 200*a*. By way of example, the control module 24 could be configured to use a display device, for example, a display device behind the steering wheel, as seen by the driver, or to use a head-up display unit (also referred to as: head-up display) to depict the warning information, for example, to inform a driver about a possible risk of collision.

In some exemplary embodiments, the control module 24 could be configured to provide a driver of the vehicle 200*a* with steering recommendations for the driving recommendation based on the information about the probable driving intention of the at least one further vehicle 100 and based on the further information about the probable driving intention of the vehicle 200*a*. By way of example, the control module 24 could be configured to depict a superimposition of the probable trajectories of vehicles in surroundings of the vehicle 200*a*, with a proposed trajectory for the vehicle 200*a*. Alternatively or additionally, the control module 24 could be configured to use a head-up display to provide lane change recommendations and/or acceleration or braking recommendations.

In some exemplary embodiments, the vehicle 200*a* could comprise automatic distance regulation and/or an autopilot. By way of example, the apparatus 20 could comprise the automatic distance regulation and/or the autopilot, or the control module 24 could be configured to control or influence the automatic distance regulation and/or the autopilot. In some exemplary embodiments, the control module 24 could be configured to steer the vehicle 200*a* based on the driving recommendation, for example, by longitudinal and/or transverse steering based on the driving recommendation. In at least some exemplary embodiments, the control module 24 could be configured to steer the vehicle only when the driver of the vehicle does not intervene. The control module 24 could, by way of example, be configured to keep or adapt a spacing of an automobile traveling ahead, to perform evasive maneuvers, to perform a filtering maneuver or to perform an overtaking maneuver, based on the driving recommendation. In some exemplary embodiments, systems for longitudinal and transverse control of the vehicles amid regulation of the spacing from other vehicles could relate to the distance/time points of the intention messages that are sent by the other vehicles, rather than to the calculated spacing from the vehicle in front, as is customary with normal ACC systems.

Figure 4:
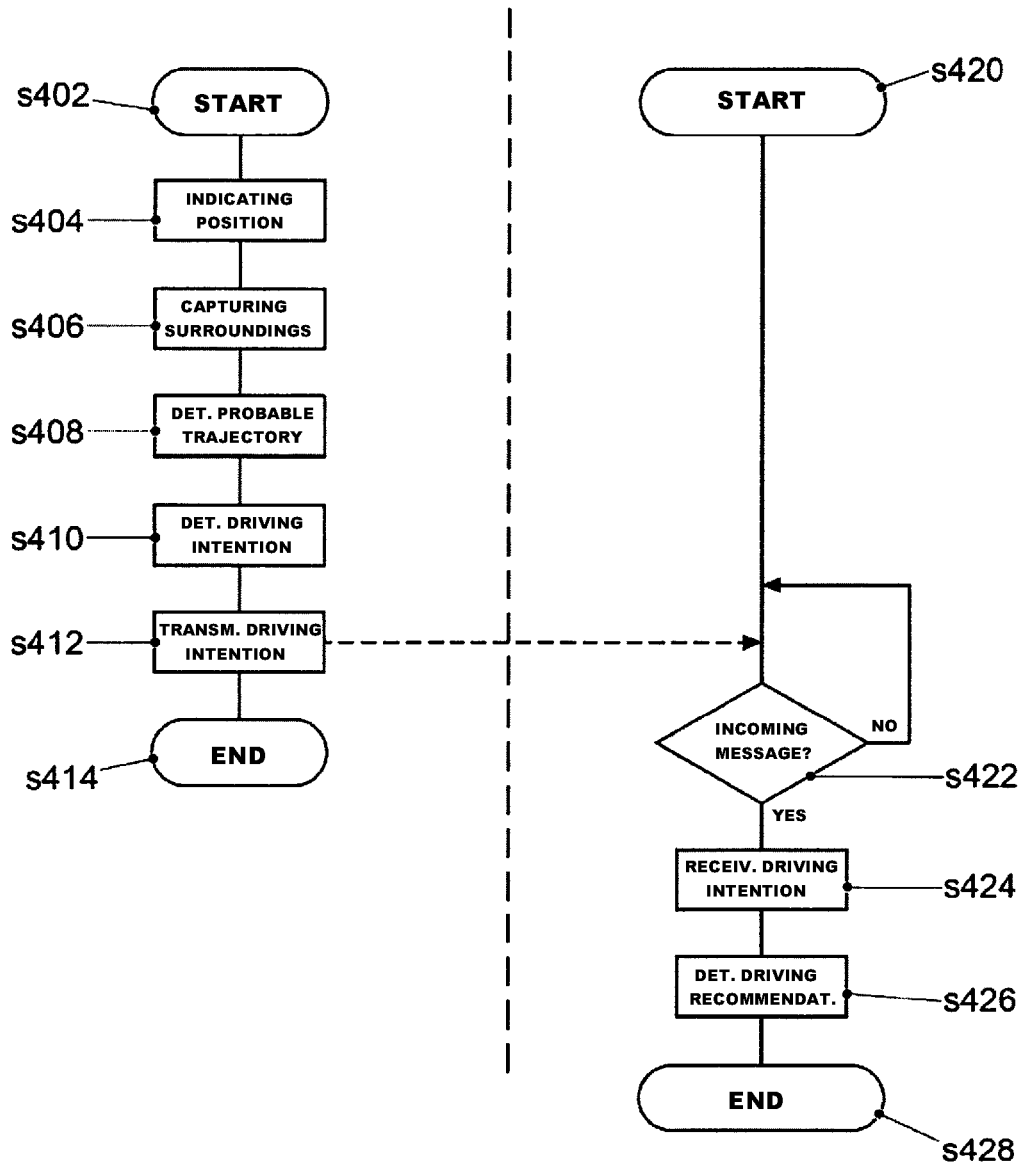
FIG. 4 shows a flowchart for an exemplary embodiment of a further method for providing information about a probable driving intention of a first vehicle and of a method for a second vehicle for determining a driving recommendation.

FIG. 4 illustrates a flowchart for an exemplary embodiment of a further method (left-hand side in FIG. 4) for providing information about a probable driving intention of a first vehicle and methods (right-hand side in FIG. 4) for a second vehicle for determining a driving recommendation.

In the first vehicle, the method begins at operation at s402. First, a locating device (for example, GPS) is used to indicate the approximate position of the first vehicle using first position data (operation at s404). The position data can be used to indicate map data that are available from the memory 220 (FIG. 2) or via the locating device. That is to say that, in addition to data from conventional sensors, highly accurate map material is also used. As a result of the use of such maps, topology changes are identified much more easily. Additionally, particularly in cities, the vehicle sensor system is not always capable of capturing the entire route over the next seven seconds (turning, concealment by other vehicles). Therefore, the trajectory is planned partly on the basis of map data.

After operation at s404, information about the surroundings in proximity to the first vehicle is captured (operation at s406) using cameras and/or sensors in the first vehicle. Next, information about a probable trajectory of the first vehicle (100) is determined (operation at s408), for example, input by the user is followed by the probable trajectory being created in accordance with the form of description depicted below.

Based on the information about the probable trajectory of the first vehicle, the position data and the information about the surroundings, information about a probable driving intention of the first vehicle (100) is provided (operation at s410). Finally, (wireless) transmission (operation at s412) of the information about the probable driving intention of the first vehicle to a second vehicle and/or one or more vehicle-external entities is effected.

Referring to the right-hand side in FIG. 4, the method begins for the second vehicle at operation at s420. The control module 24 of the second vehicle checks (operation at s422) messages incoming via the wireless connection. If no incoming message is identified, the method returns to operation at s420.

If an incoming message is identified, however, information about a probable driving intention of at least one first vehicle is obtained (operation at s424), the information about a probable driving intention of at least one first vehicle being stipulated. Thereafter, a driving recommendation is determined (operation at s428) based on the information about the probable driving intention of the at least one first vehicle. The method ends at operation at s428.

FIGS. 5 to 12 show, for different driving maneuvers, the properties of the trajectories and the form of description to define the trajectories in accordance with the driving maneuvers.

Figure 5:
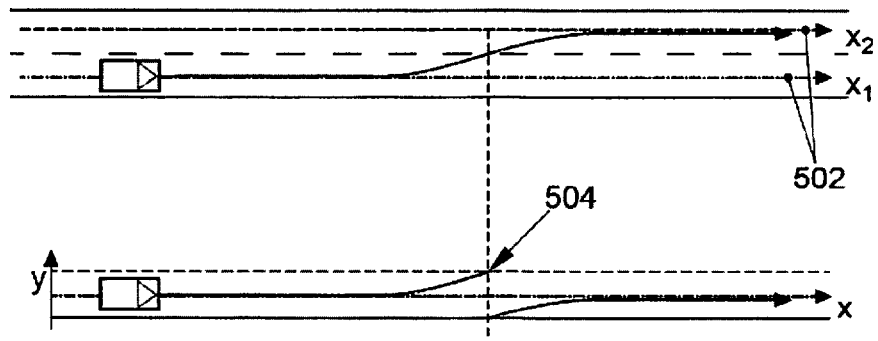
FIG. 5 to FIG. 12 show, for various driving maneuvers, the properties of the trajectories and the form of description to define the trajectories in accordance with the driving maneuvers.

FIG. 5 schematically shows the coordinate system ("Frenet"), on the basis of which the descriptions of the trajectories are determined. In accordance with this system, an X axis 502 is defined by the center of the lane, and the Y axis describes only the deviation of the vehicle within the lane. It follows from this that every lane describes an X axis, and every trajectory must be accompanied by a description that describes the coordinate system used. For such systems, it is the case that "The coordinate system is on the road".

This coordinate system includes:
  map inaccuracies can be identified and can be deducted on
    the basis of the known semantics.
  Requires lane recognition.
  Further, the "Frenet coordinates" includes:
  The heading is not as important as in the case of the
    "relative coordinates".
  The map inaccuracy is not as important as in the case of
    the "absolute coordinates". Map matching on the roadway suffices.
  This requires the coordinate system used to be able to be
    described well.
  Frenet works only if there is a roadway with lane markings.

FIG. 5 shows a change of lane 504: in accordance with the Frenet system, such a change corresponds to a change of coordinate system.

Figure 6:
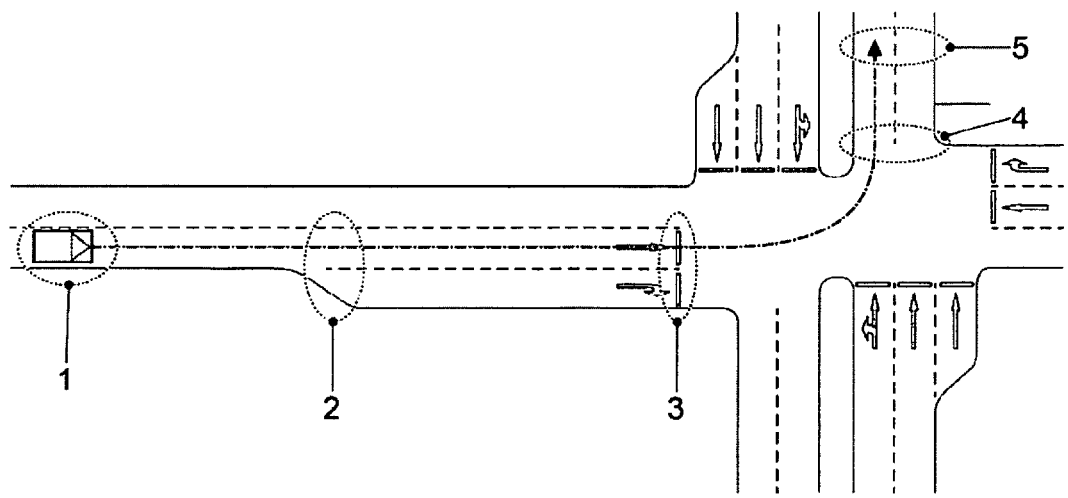

FIG. 6 uses an example (junction) to show multiple points (1 to 5) for which information needs to be provided to describe the trajectory in accordance with disclosed embodiments. On every change of topology and at the start/end, information about the coordinate system should be available.

In FIG. 5, for example:

1 shows the starting position of the ego vehicle
2 shows a change in the number of lanes
3 shows the entry to the junction
4 shows the exit from the junction
5 shows the end of the forecast.

In this case, a left turn is made at a junction. The description of the trajectory is as follows:

| Lane | Dist | Additional |
| --- | --- | --- |
| 1 | 1/1 | 0 m | GPS Pos (CAM) |
| 2 | 2/2 | 30 m | Change of topology |
| 3 | 2/2 | 40 m | Beginning of junction: road heading (90°) |
| 4 | 2/2 | ? | End of junction: road heading (0°) |
| 5 | 2/2 | 20 m | GPS Pos. |

Figure 7:
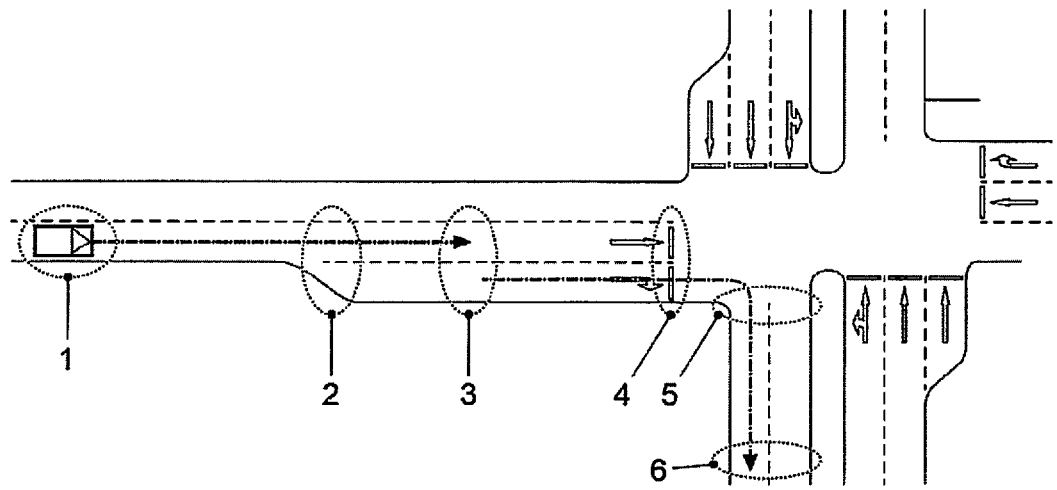

FIG. 7 shows a further example of a maneuver. In this case, a right turn is made at a junction. The description of the trajectory is as follows:

| Lane | Dist | Additional |
| --- | --- | --- |
| 1 | 1/1 | 0 m | GPS Pos (CAM) |
| 2 | 2/2 | 30 m | Change of topology |
| 3 | 1/2 | 10 m | Change of lane |
| 4 | 1/2 | 30 m | Beginning of junction: road heading (0°) |
| 5 | 1/2 | ? | End of junction: road heading (180°) |
| 6 | 1/2 | 30 m | GPS Pos. |

Figure 8:
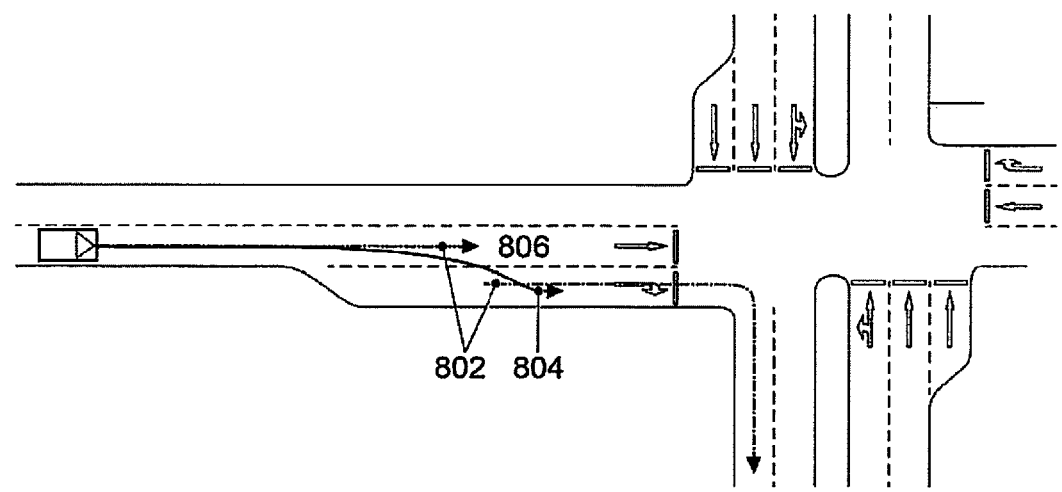
Figure 9:
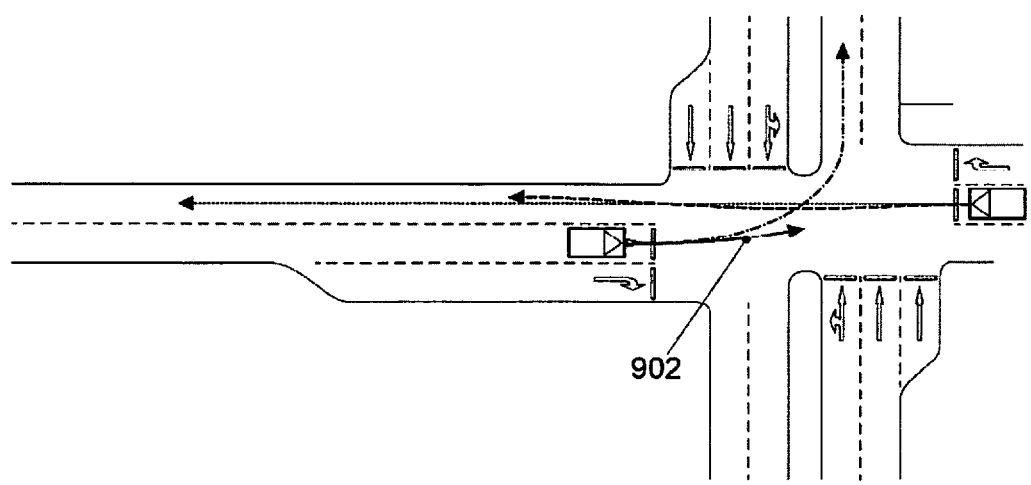

FIG. 8 shows a further example of a maneuver. The X axis 802 of the coordinate system in the event of a change of topology and the trajectory 804 are depicted. The period of time 806 should be seven seconds. In accordance with disclosed embodiments, lane-accurate intention identification is also possible if the prediction period is not sufficient for the trajectory (see FIG. 9): the period of time for the trajectory 902 is seven seconds.

Figure 10:
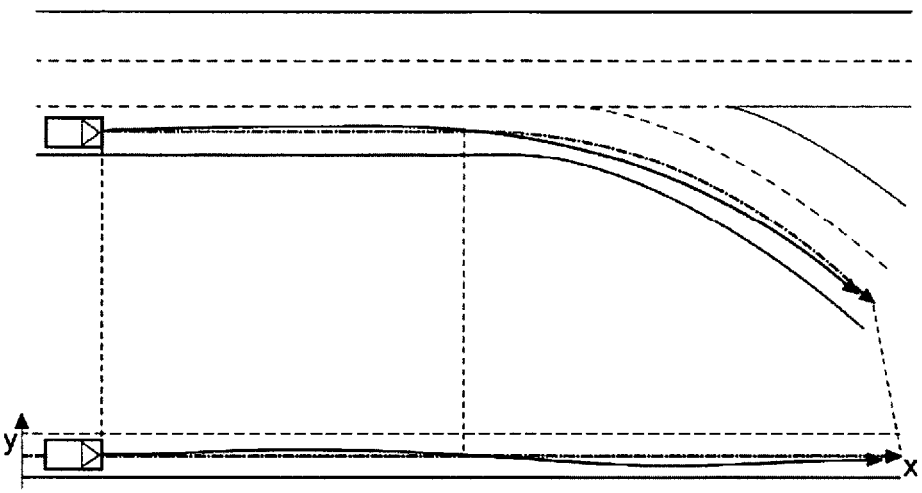

FIG. 10 shows a further example of a maneuver. In this case, a right-hand curve is taken. The description of the trajectory is as follows:

| Lane | Dist | Additional |
| --- | --- | --- |
| 1 | 1/1 | 0 m | GPS Pos (CAM) |
| 2 | 1/1 | 150 m | GPS Pos. |

Figure 11:
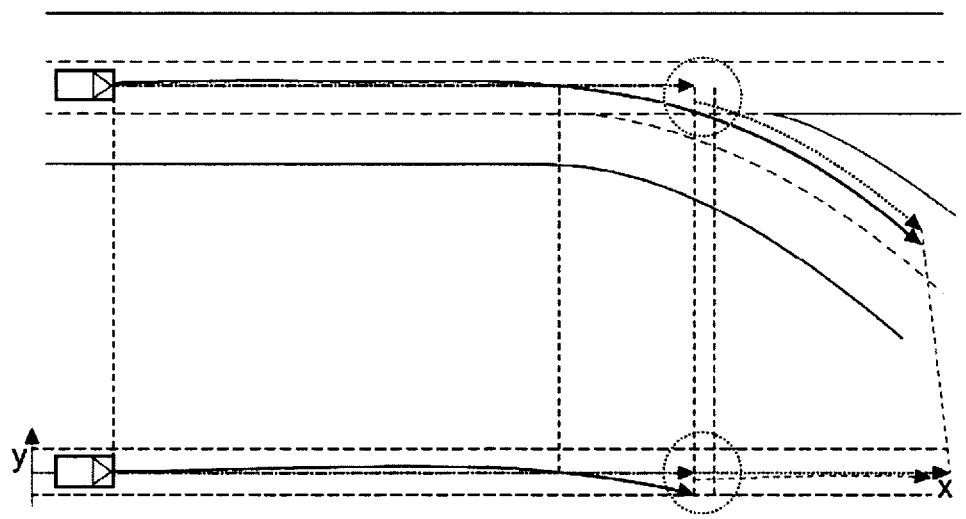
Figure 12:
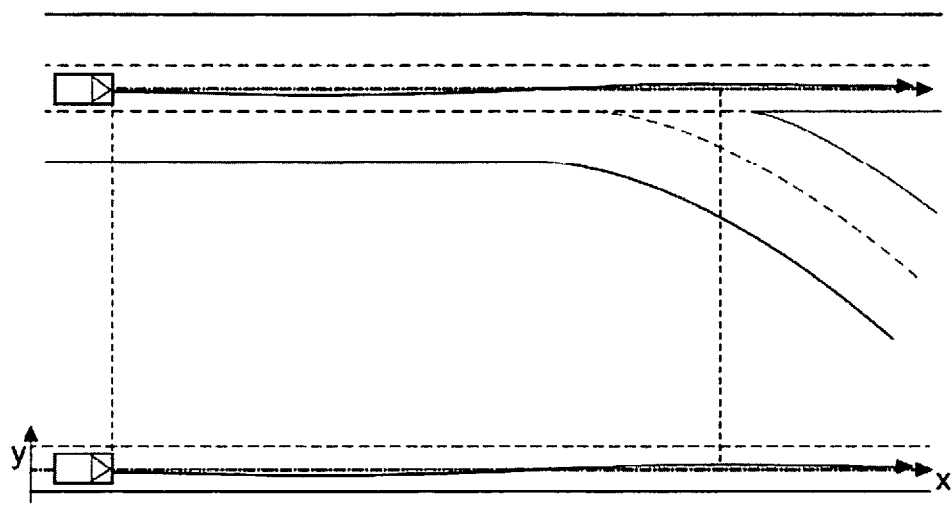

FIG. 11 shows a further example of a maneuver. In this case, an exit (right) is taken. The description of the trajectory is as follows:

| Lane | Dist | Additional |
| --- | --- | --- |
| 1 | 2/3 | 0 m | GPS Pos (CAM) |
| 2 | 2/2 | 100 m | Heading |
| 3 | 2/2 | 50 m | GPS Pos. |

FIG. 11 shows a further example of a maneuver. In this case, an exit (right) is passed. The description of the trajectory is as follows:

| Lane | Dist | Additional |
| --- | --- | --- |
| 1 | 2/3 | 0 m | GPS Pos (CAM) |
| 2 | 1/2 | 100 m | |
| 3 | 1/2 | 50 m | GPS Pos. |

LIST OF REFERENCE SYMBOLS

10 Apparatus
12 Driving analysis module
14 Control module
16 Interface
20 Apparatus
22 Interface
24 Control module
100 Vehicle
200 Vehicle-external entities
200a Vehicle
212 Information system
214 Control module
216 Nonvolatile memory
218 Main memory
220 Data memory
222 Operating system
224 Driving intention application
226 First receiver
228 Second receiver
230 GPS unit
232 Camera
234 Ultrasonic sensor
502 X axis
504 Change of lane
802 X axis
804 Trajectory
806 Period of time
902 Trajectory

The invention claimed is:
1. A method for providing information about a probable driving intention of a first vehicle to a second vehicle over a communication network, the method comprising:
ascertaining, using a locating device in the first vehicle, first vehicle position data, which indicate an approximate position of the first vehicle relative to map data;
capturing, using cameras and/or sensors in the first vehicle, information about surroundings in proximity to the first vehicle;
deriving at least one feature of the surroundings in proximity to the first vehicle from the captured information;
determining, in the first vehicle, information about a probable trajectory of the first vehicle relative to the derived at least one feature, wherein the information about the probable trajectory includes information about a plurality of time/position points, wherein each time/position point comprises a time component and a position component;
determining an expected variation of a position of the first vehicle expected during the first vehicle's probable driving intention, wherein the determination of information about the first vehicle's probable trajectory includes altering the temporal spacing of the time components or position spacing of the position components based on the expected variation of the position of the first vehicle during the first vehicle's probable driving intention, such that the temporal spacing or position spacing decreases in response to an increase in the expected variation;

providing, in the first vehicle, information about the probable driving intention of the first vehicle based on the probable trajectory information of the first vehicle, the first vehicle position data, the information about the first vehicle surroundings and the map data;

transmitting, from the first vehicle, the information about the probable driving intention of the first vehicle to the second vehicle and/or one or more vehicle-external entities; and operating the second vehicle according to a driving recommendation derived based on the information about the probable driving intention of the first vehicle.

2. The method of claim 1, wherein the information about the probable driving intention comprises at least one first image captured by the cameras and/or sensors, and/or deriving the at least one feature includes extracting the at least one feature from the at least one first image, and/or the map data.

3. The method of claim 2, wherein the at least one first feature is a number of lanes at a current position of the first vehicle, and/or is an approach toward or positioning at a light signal installation, a T junction, a lane convergence, a lane divergence, or a junction.

4. The method of claim 1, wherein the determining of information about a probable trajectory of the first vehicle is based on at least one element from a group comprising information about a steering angle, information about a position of the first vehicle, information about a speed of the first vehicle, information about an acceleration of the first vehicle, information about a direction of travel indicator of the first vehicle, information about direction of travel indicators of other vehicles, information about a light signal installation, information about an automatic driving control system and map information.

5. The method of claim 4, wherein the time components of the plurality of time/position points correspond to absolute times, times relative to a global reference time system and/or times relative to a local reference time system, and/or the position components of the plurality of time/position points comprise at least one element from the group comprising absolute position points, position points relative to a traffic infrastructure and selection of a geometric component of the traffic infrastructure.

6. The method of claim 1, wherein the information about the probable driving intention comprises the information about the probable trajectory as a visual description or indication that identifies a context for the probable trajectory.

7. A method for utilizing information about a probable driving intention of a first vehicle by a second vehicle over a communication network, the method comprising:

obtaining information about a probable driving intention of the first vehicle, wherein the information about a probable driving intention of at least one first vehicle is provided by ascertaining, using a locating device of the first vehicle, first vehicle position data, which indicate an approximate position of the first vehicle relative to map data, by capturing, using cameras and/or sensors in the first vehicle, information about surroundings in proximity to the first vehicle, by deriving at least one feature of the surroundings in proximity to the first vehicle from the captured information, by determining, in the first vehicle, information about a probable trajectory of the first vehicle relative to the derived at least one feature, wherein the information about the probable trajectory includes information about a plurality of time/position points, wherein each time/position point comprises a time component and a position component, by determining an expected variation of a position of the first vehicle expected during the first vehicle's probable driving intention, wherein the determination of information about the first vehicle's probable trajectory includes altering the temporal spacing of the time components or position spacing of the position components based on the expected variation of the position of the first vehicle during the first vehicle's probable driving intention, such that the temporal spacing or position spacing decreases in response to an increase in the expected variation, and by providing, in the first vehicle, information about a probable driving intention of the first vehicle, based on the probable trajectory information of the first vehicle, the first vehicle position data, the information about the first vehicle surroundings and the map data, and by transmitting, from the first vehicle, the information about the probable driving intention of the first vehicle to the second vehicle and/or one or more vehicle-external entities; and operating the second vehicle according to a driving recommendation derived based on the information about the probable driving intention of the first vehicle.

8. The method of claim 7, wherein the determining of the driving recommendation for the second vehicle comprises:

ascertaining, using a locating device of the second vehicle, position data that indicate an approximate position of the second vehicle; and capturing, using cameras and/or sensors in the second vehicle, information about surroundings in proximity to the second vehicle and deriving at least one feature of the surroundings of the second vehicle from the captured information about the surroundings of the second vehicle.

9. The method of claim 8, wherein the determining of the driving recommendation for the second vehicle comprises:

extracting, from the information about the probable driving intention of the at least one first vehicle, information about the at least one feature of the surroundings in proximity to the first vehicle; and comparing the information about the surroundings in proximity to the second vehicle with the information about the surroundings in proximity to the first vehicle, to determine whether there is a match, and, in the event of a match, determining the driving recommendation.

10. The method of claim 9, wherein the determining of the driving recommendation for the second vehicle comprises:

extracting, from the information about the probable driving intention of the at least one first vehicle, the at least one feature of the surroundings of the first vehicle;

extracting, from at least one image captured by the cameras and/or sensors in the second vehicle, the at least one feature of the surroundings of the second vehicle; and executing a matching algorithm to determine whether there is a match between the at least one feature of the surroundings of the first vehicle and the at least one feature of the surroundings of the second vehicle, and, in the event of a match, determining the driving recommendation.

11. The method of claim 10, wherein the at least one feature is a number of lanes at a current position of the first vehicle, and/or is an approach toward or positioning at a light signal installation, a T junction, a lane convergence, a lane divergence, or a junction.

12. An apparatus for use in a first vehicle to communicate with a second vehicle over a communication network, the apparatus comprising:
a driving analysis module;
a control module; and
an interface,
wherein the control module obtains information about a probable driving intention of the first vehicle, wherein the information about the probable driving intention of the first vehicle is provided by ascertaining, using a locating device of the first vehicle, first vehicle position data, which indicate an approximate position of the first vehicle relative to map data, by capturing, using cameras and/or sensors in the first vehicle, information about surroundings in proximity to the first vehicle, by deriving at least one feature of the surroundings in proximity to the first vehicle from the captured information, by determining, in the first vehicle, information about a probable trajectory of the first vehicle relative to the derived at least one feature, wherein the information about the probable trajectory includes information about a plurality of time/position points, wherein each time/position point comprises a time component and a position component, by determining an expected variation of a position of the first vehicle expected during the first vehicle's probable driving intention, wherein the determination of information about the first vehicle's probable trajectory includes altering the temporal spacing of the time components or position spacing of the position components based on the expected variation of the position of the first vehicle during the first vehicle's probable driving intention, such that the temporal spacing or position spacing decreases in response to an increase in the expected variation, and by providing, in the first vehicle, information about a probable driving intention of the first vehicle, based on the probable trajectory of the first vehicle, the first vehicle position data, the information about the first vehicle surroundings and the map data, and by transmitting to the second vehicle and/or one or more vehicle-external entities; and
operating the second vehicle according to a driving recommendation derived based on the information about the probable driving intention of the first vehicle.

13. The apparatus of claim 12, wherein the information about the probable driving intention comprises at least one first image captured by the cameras and/or sensors, and/or the at least one feature is extracted from the at least one first image, and/or the map data.

14. The apparatus of claim 13, wherein the at least one first feature is a number of lanes at a current position of the first vehicle, and/or is an approach toward or positioning at a light signal installation, a T junction, a lane convergence, a lane divergence, or a junction.

15. The apparatus of claim 12, wherein the determining of information about a probable trajectory of the first vehicle is based on at least one element from a group comprising information about a steering angle, information about a position of the first vehicle, information about a speed of the first vehicle, information about an acceleration of the first vehicle, information about a direction of travel indicator of the first vehicle, information about a spacing of other vehicles, information about direction of travel indicators of other vehicles, information about a light signal installation, information about an automatic driving control system and map information.

16. The apparatus of claim 15, wherein the time components of the plurality of time/position points correspond to absolute times, times relative to a global reference time system and/or times relative to a local reference time system, and/or the position components of the plurality of time/position points comprise at least one element from the group comprising absolute position points, position points relative to a traffic infrastructure and selection of a geometric component of the traffic infrastructure.

17. An apparatus for use in a second vehicle based on information about a probable driving intention of a first vehicle provided by the first vehicle to the second vehicle over a communication network, the apparatus comprising:
a driving analysis module;
a control module; and
an interface,
wherein the control module obtains information about the probable driving intention of the first vehicle, wherein the information about a probable driving intention of the first vehicle is provided by ascertaining, using a locating device in the first vehicle, first vehicle position data, which indicate an approximate position of the first vehicle relative to map data, by capturing, using cameras and/or sensors in the first vehicle, information about surroundings in proximity to the first vehicle, by deriving at least one feature of the surroundings of the at least one first vehicle from the captured information about the surroundings in proximity to the first vehicle from the captured information, by determining, in the first vehicle, information about a probable trajectory of the first vehicle relative to the derived at least one feature of the surroundings of the first vehicle,
wherein the information about the probable trajectory includes information about a plurality of time/position points, wherein each time/position point comprises a time component and a position component, by determining an expected variation of a position of the first vehicle expected during the first vehicle's probable driving intention, wherein the determination of information about the first vehicle's probable trajectory includes altering the temporal spacing of the time components or position spacing of the position components based on the expected variation of the position of the first vehicle during the first vehicle's probable driving intention, such that the temporal spacing or position spacing decreases in response to an increase in the expected variation, and by providing information about the probable driving intention of the first vehicle, based on the probable trajectory information of the first vehicle, the first vehicle position data, the information about the first vehicle surroundings and the map data, and by transmitting, from the first vehicle, the information about the probable driving intention of the first vehicle to the second vehicle and/or one or more vehicle-external entities, and
wherein the control module operates the second vehicle according to a driving recommendation derived based on the information about the probable driving intention of the first vehicle.

18. The apparatus of claim 17, wherein the determining of a driving recommendation comprises:
ascertaining, using a locating device, position data that indicate the approximate position of the second vehicle; and capturing, using cameras and/or sensors in the second vehicle, information about surroundings in proximity to the second vehicle.

19. The apparatus of claim 18, wherein the determining of a driving recommendation comprises:
   extracting, from the information about the probable driving intention of the at least one first vehicle, information about the surroundings in proximity to the first vehicle; and
   comparing the information about the surroundings in proximity to the second vehicle with the information about the surroundings in proximity to the first vehicle, to determine whether there is a match, and, in the event of a match, determining a driving recommendation.

20. The apparatus of claim 18, wherein the determining of a driving recommendation comprises:
   extracting, from the information about the probable driving intention of at least one first vehicle, at least one first surroundings feature of the first vehicle;
   extracting, from at least one image captured by the cameras and/or sensors in the second vehicle, at least one second surroundings feature of the second vehicle; and
   executing a matching algorithm to determine whether there is a match between the at least one first feature and the at least one second feature, and, in the event of a match, determining a driving recommendation.

21. The apparatus of claim 20, wherein the at least one first feature is a number of lanes at a current position of the first vehicle, and/or is an approach toward or positioning at a light signal installation, a T junction, a lane convergence, a lane divergence, or a junction.

22. A vehicle, comprising an apparatus according to claim 12.

23. A vehicle, comprising an apparatus according to claim 17.

24. A memory storing a computer program product having program code for performing a method for providing information about a probable driving intention of a first vehicle to a second vehicle over a communication network, when the program product is executed on an apparatus or an information system, the method comprising:
   ascertaining, using a locating device in the first vehicle, first vehicle position data, which indicate an approximate position of the first vehicle relative to map data;
   capturing, using cameras and/or sensors in the first vehicle, information about surroundings in proximity to the first vehicle;
   deriving at least one feature of the surroundings in proximity to the first vehicle from the captured information;
   determining, in the first vehicle, information about a probable trajectory of the first vehicle relative to the derived at least one feature, wherein the information about the probable trajectory includes information about a plurality of time/position points,
   wherein each time/position point comprises a time component and a position component;
   determining an expected variation of a position of the first vehicle expected during the first vehicle's probable driving intention, wherein the determination of information about the first vehicle's probable trajectory includes altering the temporal spacing of the time components or position spacing of the position components based on the expected variation of the position of the first vehicle during the first vehicle's probable driving intention, such that the temporal spacing or position spacing decreases in response to an increase in the expected variation;
   providing, in the first vehicle, information about the probable driving intention of the first vehicle based on the probable trajectory information of the first vehicle, the first vehicle position data, the information about the first vehicle surroundings and the map data;
   transmitting, from the first vehicle, the information about the probable driving intention of the first vehicle to the second vehicle and/or one or more vehicle-external entities; and
   operating the second vehicle according to a driving recommendation derived based on the information about the probable driving intention of the first vehicle.

25. A memory storing a computer program product having program code for performing a method for utilizing information about a probable driving intention of a first vehicle by a second vehicle over a communication network, when the program product is executed on an apparatus or an information system, the method comprising:
   obtaining information about a probable driving intention of the first vehicle,
   wherein the information about a probable driving intention of the first vehicle is provided by ascertaining, using a locating device of the first vehicle, first vehicle position data, which indicate an approximate position of the first vehicle relative to map data, by capturing, using cameras and/or sensors in the first vehicle, information about surroundings in proximity to the first vehicle, by deriving at least one feature in proximity to the first vehicle from the captured information, by determining, in the first vehicle, information about a probable trajectory of the first vehicle relative to the derived at least one feature,
   wherein the information about the probable trajectory includes information a plurality of time/position points, wherein each time/position point comprises a time component and a position component, by determining an expected variation of a position of the first vehicle expected during the first vehicle's probable driving intention, wherein the determination of information about the first vehicle's probable trajectory includes altering the temporal spacing of the time components or position spacing of the position components based on the expected variation of the position of the first vehicle during the first vehicle's probable driving intention, such that the temporal spacing or position spacing decreases in response to an increase in the expected variation, and by providing, in the first vehicle, information about a probable driving intention of the first vehicle, based on the probable trajectory information of the first vehicle, the first vehicle position data, the information about the first vehicle surroundings and the map data, and by transmitting, from the first vehicle, the information about the probable driving intention of the first vehicle to the second vehicle and/or one or more vehicle-external entities; and
   operating the second vehicle according to a driving recommendation derived based on the information about the probable driving intention of the first vehicle.

* * * * *